United States Patent
Hoff et al.

(10) Patent No.: US 6,682,155 B2
(45) Date of Patent: Jan. 27, 2004

(54) TRACK TENSION ADJUSTMENT MANAGEMENT ACTUATOR

(75) Inventors: Brian D. Hoff, East Peoria, IL (US); Thomas E. Oertley, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 10/309,783

(22) Filed: Dec. 4, 2002

(65) Prior Publication Data

US 2003/0122422 A1 Jul. 3, 2003

Related U.S. Application Data

(60) Provisional application No. 60/345,790, filed on Dec. 31, 2001.

(51) Int. Cl.[7] ............................................. B62D 55/112
(52) U.S. Cl. ...................................... 305/145; 305/148
(58) Field of Search ................................ 305/143, 144, 305/145, 146, 148, 153, 155

(56) References Cited

U.S. PATENT DOCUMENTS

| | | | | |
|---|---|---|---|---|
| 2,837,379 A | * | 6/1958 | Selyem et al. ............... | 305/145 |
| 3,787,097 A | * | 1/1974 | Orr ............................. | 305/145 |
| 3,792,910 A | | 2/1974 | Kaufman et al. | |
| 3,910,649 A | * | 10/1975 | Roskaft ...................... | 305/144 |
| 4,457,564 A | * | 7/1984 | Ruge et al. .................. | 305/149 |
| 4,470,583 A | * | 9/1984 | Peiffer et al. ............... | 267/64.26 |
| 5,316,381 A | | 5/1994 | Isaacson et al. | |
| 5,482,126 A | | 1/1996 | Bouit et al. | |
| 5,511,868 A | | 4/1996 | Eftefield | |
| 5,906,150 A | | 5/1999 | Sakai et al. | |
| 6,276,768 B1 | | 8/2001 | Miller | |

FOREIGN PATENT DOCUMENTS

| | | | |
|---|---|---|---|
| JP | 55-51672 | * | 4/1980 |
| WO | WO 87/04987 | * | 8/1987 |

OTHER PUBLICATIONS

"P.I.T. Liquid Compression and Tension Springs Track Tensioning Devices Dampening Elements", Petersmann Innovative Technik product brochure, date unknown.

* cited by examiner

Primary Examiner—Russell D. Stormer
(74) Attorney, Agent, or Firm—Steven G Kibby

(57) ABSTRACT

A track tension actuator is provided for a track assembly having, an idler wheel, a drive wheel, a drive track entrained about the drive wheel and idler, and a hydraulic motor operable to advance the drive wheel. A drive circuit is operable to supply pressurized fluid to the hydraulic motor. The actuator is coupled to the idler wheel, and includes a travel chamber, travel piston, a recoil chamber, and a recoil piston. The recoil chamber is pressurized to urge the recoil piston in a first direction away from the drive wheel. The drive fluid pressurizes the travel piston, which in turn contacts and urges the travel piston in a second direction against the recoil piston to reduce the track tension.

14 Claims, 4 Drawing Sheets

TRACK TENSION ADJUSTMENT MANAGEMENT ACTUATOR

This application claims the benefit of prior provisional application Serial No. 60/345,790 filed Dec. 31, 2001.

TECHNICAL FIELD

This invention relates generally to a track tension adjustment actuator and, more particularly, to an actuator operable to reduce tension on an idler wheel of endless track machine when the machine is traveling.

BACKGROUND

A tracked work machine, such as a track-type tractor or excavator, is typically supported and propelled by a pair of undercarriage assemblies. Each of the pair of undercarriage assemblies includes an endless track chain having a plurality of interconnected articulating components or links. Each undercarriage assembly typically also includes a drive wheel or sprocket and one or more idler wheels. The track chain is advanced around the drive wheel and the one or more idler wheels.

During operation of the work machine, it is necessary to maintain tension on the track chain in order to keep the chain from derailing or from jumping between teeth on the sprocket. In order to maintain tension on the track chain, a tension adjustment mechanism such as a hydraulic cylinder or coiled spring is often included in the undercarriage assembly.

With regard to excavators, it is generally desirable to have the track chain relatively taut during performance of a digging or other type of work operation in order to prevent the excavator from rolling back and forth within the interior of the track chain as a result of recoil forces generated during performance of the work operation. When digging with a tight track chain, the machine feels more stable to the operator and less wear occurs to the track components. To create tension on the track chain, the hydraulic cylinder or the coiled spring of the tension adjustment mechanism urges the idler wheel away from the drive wheel, increasing the dimension of the undercarriage assembly which the track chain must encircle.

In contrast, it is generally desirable to have the track chain relatively loose during advancement or travel of an excavator. By loosening or otherwise decreasing tension on the track chain below the tension used when digging, wear on the components associated with the undercarriage assembly is reduced. This increases the efficiency and even the useful life of the excavator. To reduce tension in the track chain, the hydraulic cylinder or coiled spring of the tension adjustment mechanism allows the idler wheel to move toward the drive wheel.

The tension adjustment mechanism also provides a recoil function in the track chain, accommodating temporary forces on the track such as when a rock or the like is ingested between the track and the wheels during advancement of the excavator. In these instances, the idler wheel is permitted to recoil toward the drive wheel in order to accommodate the extra length the track must encircle in order to accommodate the rock without breaking.

U.S. Patent No. 6,276,768 discloses a tensioning mechanism which decreases track tension when the machine is traveling. In an excavator embodiment, the '768 patent provides a slave piston secured to the idler wheel and in fluid communication with a master piston. A pilot signal from any of the numerous components associated with the hydraulic drive system (or implement system) operates a valve assembly, which in turn controls the supply of fluid from the recoil accumulator to the master piston assembly. An increase in pressure from the hydraulic drive system causes the valve assembly to open the master piston assembly to tank, thereby allowing the slave piston to retract a predetermined amount and reduce track tension. A decrease in drive system pressure connects the master piston to the accumulator through the valve assembly, in turn extending the slave piston and increasing track tension. Use of the recoil accumulator fluid to adjust slack and increase tension to the track makes it difficult to adjust each parameter independently.

The present invention is directed to solving one or more of the problems or disadvantages set forth above of current work machines.

SUMMARY OF THE INVENTION

According to one aspect of the present invention, a track tensioning actuator is provided for a track assembly having, an idler wheel, a drive wheel, a drive track entrained about the drive wheel and idler, and a drive circuit operable to advance the drive wheel. The actuator comprises a hydraulic cylinder housing and a recoil piston positioned within the cylinder housing and coupled with the idler wheel. The cylinder housing and recoil piston form a recoil chamber pressurized to urge the recoil piston in a first direction away from the drive wheel. A travel piston is also positioned within the cylinder housing cooperating to define a travel chamber in fluid communication with the drive circuit. The travel piston is responsive to receipt of pressurized fluid from the drive circuit to contact and urge the recoil piston in a second direction away from the idler wheel. A track assembly using the actuator is also disclosed.

According to another aspect of the invention, a method is disclosed of tensioning a track assembly having an idler wheel, a drive wheel, a drive track entrained about the drive wheel and idler wheel, and a hydraulic motor operable to advance the drive wheel. The method comprises coupling a recoil piston of an actuator to the idler wheel, the actuator further including a cylinder housing, recoil chamber, a travel chamber, and a travel piston in fluid communication with the travel chamber. The recoil chamber is pressurized to tension the track. When pressurized fluid is supplied to the hydraulic motor to advance the drive wheel, pressurized fluid is responsively delivered to the travel chamber of the actuator, operating the travel piston to forcibly retract the recoil piston. Retraction of the recoil piston reduces the track tension during travel.

BRIEF DESCRIPTION OF THE DRAWINGS

A more complete appreciation of this invention will be understood by reference to the following detailed description when considered in conjunction with the accompanying drawings in which like reference symbols indicate the same or similar components, wherein.

DETAILED DESCRIPTION

Figure 1:
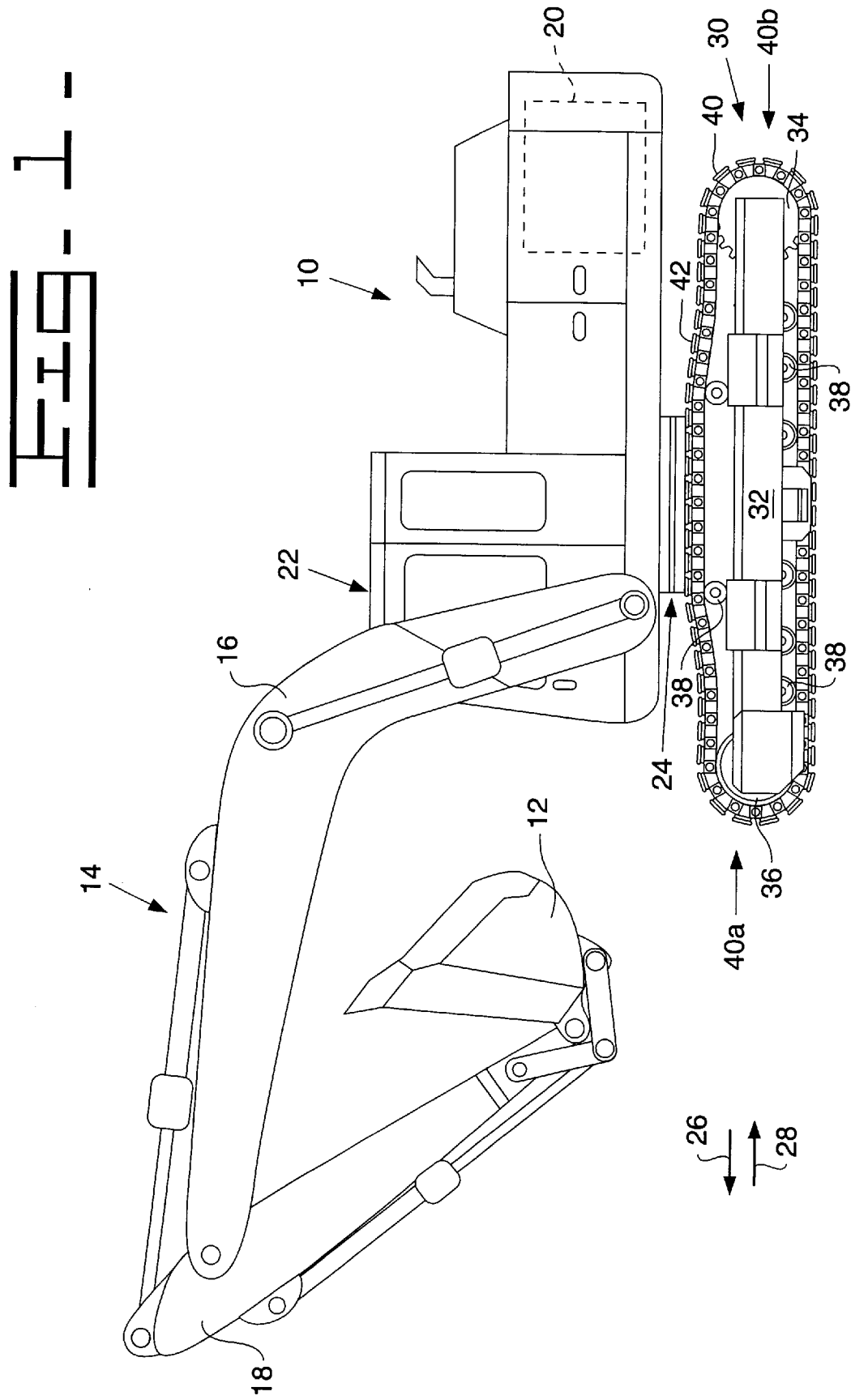
FIG. 1 is a side elevational view of an excavator which incorporates an exemplary embodiment of the present invention therein.

FIG. 1 illustrates a tracked work machine, for example, a hydraulic excavator 10, that is utilized to perform numerous work functions, such as digging and material movement. The excavator 10 may include a number of work implements, such as, for example, a hydraulically-powered bucket assembly 12, which is secured to an end of a boom assembly 14 having a boom arm 16 and a stick assembly 18. The excavator 10 further includes an engine such as, for example, a diesel engine 20, for providing the motive power for both advancing the excavator 10 and operating the bucket assembly 12 and the boom assembly 14.

Figure 2:
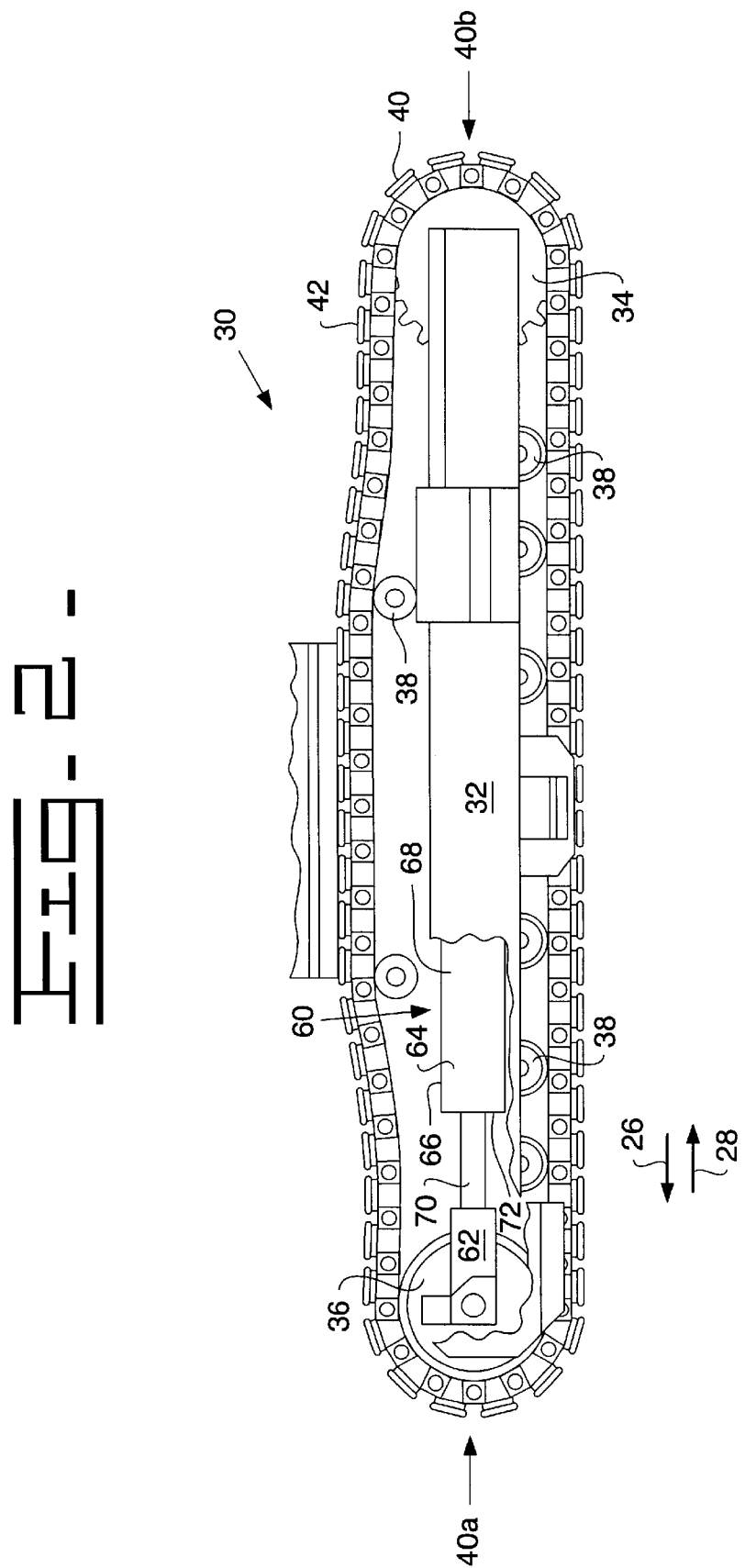
FIG. 2 is an enlarged, partially cutaway side elevational view of the undercarriage assembly of the excavator of FIG. 1.

The excavator 10 also includes a pair of track assemblies, although only one is shown in FIGS. 1 and 2. Each track assembly 30 generally includes a frame assembly 32, a drive wheel 34, an idler wheel 36, and a number of midrollers 38. For each track assembly 30, a drive track 40, such as, for example, an endless track chain 42, may be driven by the drive wheel 34 so as to be advanced around the idler wheel 36 and each of the midrollers 38, thereby providing the motive power for advancing the excavator 10. It should be appreciated that drive wheel 34 may comprise a drive wheel which is frictionally engaged with the drive track 40 or a drive sprocket which is mechanically engaged with the drive track chain 40. In one embodiment, the idler wheel 36 is positioned at a first end 40a of the track assembly 30, while the drive wheel 34 is positioned at a second and opposite end 40b of the assembly. For simplicity of reference, the first end 40a at which the idler wheel 36 is positioned is commonly described as the "front" of the excavator 10 relative to a cab 22, while the second end 40b having the drive wheel 34 is described as the "rear".

Figure 3:
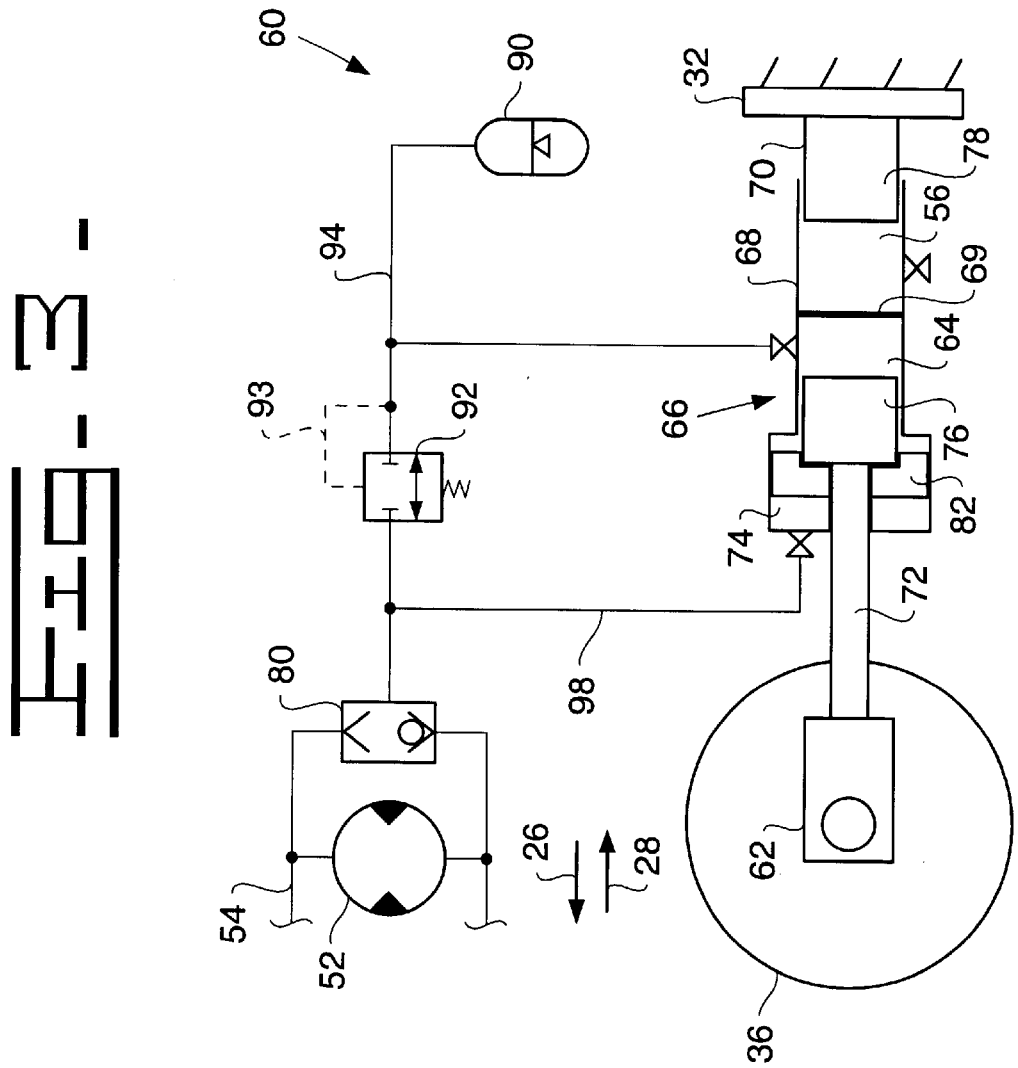
FIG. 3 is a schematic illustration of a track tensioning assembly utilizing an actuator according to an exemplary embodiment of the present invention.

FIG. 3 is a schematic illustration of a track assembly according to an exemplary embodiment of the present invention. To advance the excavator 10, mechanical output from the engine 20 (see FIGS. 1 and 2) is transmitted to the drive wheels 34 via a drive circuit 54 having a source of pressurized fluid such as a pump (not shown), and one or more hydraulic drive motors 52. Each hydraulic drive motor 52 drives at least one of the drive wheels 34 to advance the drive track 40 and, hence, the excavator 10. The drive circuit 54 supplies pressurized hydraulic fluid through the hydraulic motor 52 to advance the motor in either a forward or reverse direction, depending upon the direction of fluid flow through circuit 54 and motors 52.

As shown in FIG. 1, the excavator 10 also includes the cab 22 that is provided to enclose or otherwise house the devices associated with the excavator 10, which are utilized by an operator during operation of the excavator 10. In particular, the cab 22 houses an operator seat (not shown) and a number of control devices such as a control lever assembly (not shown) and a foot pedal assembly (not shown). The cab 22 is positioned on an undercarriage supported by the track assemblies of the excavator 10 on a swivel 24. The swivel 24 allows the cab 22 to be turned in both the clockwise and counterclockwise directions.

In addition to the engine 20, other components of the excavator 10 positioned above the swivel 24 typically include the pressurized fluid source and one or more return tanks or fluid reservoirs 58. One skilled in the art understands that the components positioned above the swivel 24 are connected with the components of the undercarriage and each track assembly 30 through various conventional fluid lines that travel through the swivel 24.

As shown in more detail in FIG. 2, each track assembly 30 includes a track tension system 60. The system 60 is configured to (1) provide a relative taut track configuration during a work operation in order to prevent the excavator 10 from rolling back and forth and (2) loosen the tension on the drive track 40 during travel of the excavator 10 in order to decrease undercarriage component wear.

The track tension system 60 may include a tension actuator 66 having a yoke 62 secured thereto through a linking member 72. As shown in FIGS. 2 and 3, the idler wheel 36 is rotatably coupled to the yoke 62. Movement of the yoke 62 and hence the idler wheel 36 in a first direction 26 of FIGS. 1–3, away from the drive wheel 34, increases tension of the drive track 40. Conversely, movement of the yoke 62 and hence the idler wheel 36 in a second direction 28 toward the drive wheel 34 decreases tension of the drive track 40.

Figure 4:
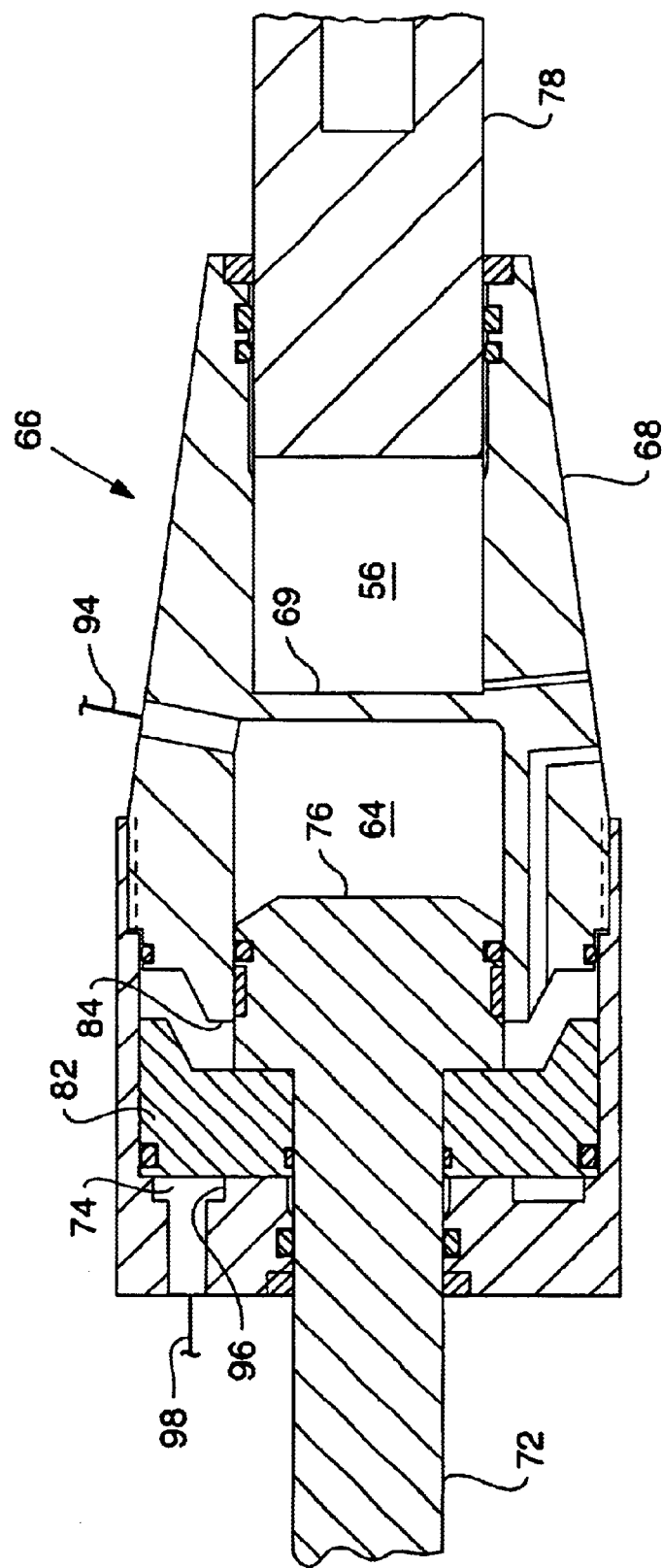
FIG. 4 is a cross-section of an actuator according an exemplary embodiment of the present invention.

In one exemplary embodiment illustrated in FIGS. 3 and 4, tension actuator 66 may be a hydraulic cylinder having a hydraulic cylinder housing 68, and a recoil piston 76 positioned within the housing and secured by a linking member 72 extending therefrom to yoke 62 associated with the idler wheel 36. An adjustment piston 78 is also movably positioned within cylinder housing 68 at an opposite end and is secured through a linking member 70 to the frame assembly 32, such that cylinder housing 68 is movable relative to frame assembly 32. It should be appreciated that linking members 70,72 may be separate piston rods or integrally formed with the corresponding pistons.

Tension actuator 66 includes a wall 69 bisecting the cylinder housing 68 into chambers of equal or unequal size. The wall 69 forms a recoil chamber 64, in cooperation with cylinder housing 68 and recoil piston 76. The wall 69 further forms an actuator adjustment chamber 56 in cooperation with cylinder housing 68 and adjustment piston 78. Alternatively, the recoil chamber and adjustment chamber may be formed from two distinct cylinder housings interconnected with one another. The position of the cylinder housing 68 relative to the frame assembly 32 is determined by a quantity of fluid in the actuator adjustment chamber 56 acting on adjustment piston 78 and wall 69. An increased quantity of fluid in adjustment chamber 56 urges wall 69 away from piston 78, resulting in housing 68 moving in first direction 26 away from frame assembly 32 and drive wheel 34.

A relatively incompressible fluid, such as grease or hydraulic oil, may be added to or withdrawn from chamber 56 during maintenance to reposition the cylinder housing 68. By adjusting the position of the housing 68 as the track chain 42 stretches or is replaced, the position of wall 69 forming a portion of recoil chamber 64 is also adjusted. Pressurized fluid within recoil chamber 64 acts against wall 69 to extend recoil piston 76 and urge idler wheel 36 away from housing 68.

The quantity of fluid in adjustment chamber 56 is preferably modified to substantially eliminate slack in track chain 42 when recoil piston 76 and linking member 72 is fully extended. Fluid pressure in recoil chamber 64 is preferably adjusted to a predetermined pressure fully extending recoil piston 76 and linking member 72 when no external recoil force is present. It should be appreciated that the recoil chamber fluid pressure at the fully extended position, referred to herein as the no recoil pressure, is proportional to the minimum force which must act against idler wheel 36 before it will begin to recoil and cause recoil piston 76 to retract.

Recoil chamber 64 may be filled with a fixed quantity of an inert gas under pressure, such as nitrogen, a compressible liquid under pressure, or hydraulic oil in fluid communication with a charged hydraulic accumulator 90 over a line 94 as illustrated. Recoil chamber 64 functions as a spring permitting recoil of the idler wheel 36 in the second direction 28 toward the drive wheel 34 responsive to an external force such as a shock, or a rock or other debris trapped in the track. As the idler wheel 36 recoils in the direction 28, corresponding movement of the recoil piston 76 reduces the size of recoil chamber 64. In the case of hydraulic oil, which is relatively incompressible, fluid is forced from recoil chamber 64 into accumulator 90 over fluid line 94, compressing a spring or gas chamber within the accumulator 90 and providing a corresponding increased fluid pressure and resistance to further recoil.

A valve 92 in fluid communication with the drive circuit may optionally be provided to recharge the recoil chamber when the pressure falls below a predetermined value. For example, when the fluid pressure available on pilot line 93 to the valve 92 drops below a force provided by a spring on the opposite side of the valve 92, the valve will open, allowing pressurized fluid from the drive circuit 54 to recharge the chamber 64 and close the valve 92.

A travel piston 82 is movably positioned within hydraulic cylinder 68 adjacent recoil piston 76 and may surround an outer periphery of linking member 72. Travel piston 82 and hydraulic cylinder 68 cooperate to form a travel chamber 74 on an opposite side of travel piston 82 and recoil piston 76 from recoil chamber 64.

The drive circuit 54 is operable to supply pressurized fluid to the hydraulic motors 52 delivering motive power to drive wheel 34. A shuttle valve assembly 80 is connected in parallel with the motor 52, so that a portion of the pressurized fluid supplied by drive circuit 54 is received on fluid line 98 connected with valve 92 and travel chamber 74 in actuator 66. Shuttle valve 80 operates as a two way check valve to prevent significant amounts of pressurized fluid from bypassing motor 52, taking power away from the motor. For example, fluid entering shuttle valve 80 from the top of drive circuit 54, referred to here for simplicity as forward flow to the motor 52, will close the bottom check and permit only so much flow as accumulator 90 and travel chamber 74 can accommodate. Likewise flow entering shuttle valve 80 from the bottom of drive circuit 54, referred to here for simplicity as reverse flow to the motor 52, will close the top check and permit only so much parasitic flow as accumulator 90 and travel chamber 74 can accommodate.

Travel piston 82 is responsive to receipt of pressurized fluid from the drive circuit into the travel chamber 74 to contact recoil piston 76 and forcibly retract the recoil piston into recoil chamber 64. Retraction of recoil piston 76 also moves idler wheel 36 in second direction 28 toward drive wheel 34, generally decreasing track tension in order to reduce wear on the track components during travel. The distance which recoil piston 76, and idler wheel 36, can be forcibly retracted is limited by the distance which the travel piston 82 can move in response to pressurized fluid in travel chamber 74. Hydraulic cylinder 68 may include an internal shoulder 84 to limit the extension of travel piston 82 away from an end 96 of hydraulic cylinder 68. Since the supply of pressurized fluid from the drive circuit 54 is substantially continuous during travel, the travel piston 82 will continue to extend until arriving at the shoulder 84, thereby retracting the recoil piston and idler wheel a predetermined distance without a need to control the amount or pressure of fluid supplied to the actuator 66.

Forcible retraction of recoil piston 76 may increase the pressure of the entrained fluid in recoil chamber 64, requiring an increased force by travel piston to cause further retraction. The surface area of travel piston 82 exposed in the direction of movement to pressurized fluid in travel chamber 74, compared to a surface area of recoil piston 76 similarly exposed to recoil chamber 64, may provide an amplification of the retraction force provided by pressurized fluid supplied from drive circuit 54. It should be appreciated that provision of force amplification by pistons 82 and 76 may complicate recharging of accumulator 90 through valve 92. An orifice (not shown) may also be provided between the shuttle valve assembly 80 and travel chamber 74 to limit the rate at which the recoil piston may extend or retract.

When pressurized fluid is no longer supplied to the drive motor 52 and fluid line 98 through shuttle valve assembly 80 (ie. travel is stopped), fluid flows back from the travel chamber 74 into drive circuit 54 through shuttle valve 80, depressurizing the travel chamber and permitting travel piston 82 to retract toward an end 96 of hydraulic cylinder 68. In the absence of recoil forces on idler wheel 36, retraction of the travel piston in turn permits recoil piston 76 and linking member 72 to fully extend to a no recoil position.

Industrial Applicability

With respect to the excavator of the exemplary embodiment, drive fluid pressure is utilized to reduce the track tension without the need to provide additional hydraulic fluid or electrical lines through the swivel mount. When the machine is traveling, drive fluid is supplied directly to a travel chamber of the actuator, causing a travel piston to contact and forcibly retract a recoil piston connected with the idler wheel. Movement of the travel piston is limited in a retracted position in the absence of pressurized fluid from the drive circuit by an end of the hydraulic cylinder, and movement of the travel piston is limited in an extended position by a shoulder formed within the hydraulic cylinder when the travel chamber is pressurized. Accordingly, the recoil piston and idler piston may be forcibly retracted by a predetermined distance during machine travel using only pressurized fluid supplied by the drive circuit to the drive motor. Even in a retracted position, the recoil piston may permit further recoil responsive to external forces on the idler wheel The direct supply of pressurized drive fluid to a travel piston avoids the need for complex valve arrangements to loosen the idler, or reduction in the pressure available to the recoil chamber. The no recoil position of the idler, as well as the recoil response, may also be adjusted independently of the drive fluid pressure according to an illustrated embodiment of the invention.

While certain present preferred embodiments of the invention and certain present preferred methods of practicing the same have been illustrated and described herein, it is to be distinctly understood that the invention is not limited thereto but may be otherwise variously embodied and practiced within the scope of the following claims.

What is claimed is:

1. A track tension actuator for a track assembly having an idler wheel, a drive wheel, a drive track entrained about the drive wheel and idler, and a drive circuit operable to advance the drive wheel, the actuator comprising:

a hydraulic cylinder housing;

a recoil piston positioned within said cylinder housing and coupled with the idler wheel, wherein said cylinder housing and said recoil piston form a recoil chamber pressurized to urge the recoil piston in a first direction away from the drive wheel; and a travel piston positioned within said cylinder housing, said cylinder housing and said travel piston defining a travel chamber in fluid communication with the drive circuit, wherein said travel piston is responsive to receipt of pressurized fluid from the drive circuit to contact said recoil piston and urge said recoil piston in a second direction away from the idler wheel.

2. The actuator of claim 1, further including a linking member coupling said recoil piston to a yoke rotatably mounting the idler wheel, wherein said travel piston surrounds an outer periphery of said linking member.

3. The actuator of claim 1, wherein said recoil chamber is fluidly coupled to a hydraulic accumulator.

4. The actuator of claim 1, wherein said recoil chamber houses a quantity of pressurized gas.

5. The actuator of claim 1, further including a wall bisecting said cylinder housing, said wall forming said recoil chamber in cooperation with said cylinder housing and said recoil piston, said actuator further including an adjustment piston secured by a linking member to a frame assembly of the track assembly, said wall forming an actuator adjustment chamber in cooperation with said cylinder housing and said adjustment piston, wherein a position of said cylinder housing relative to the frame assembly is determined by a quantity of fluid in said actuator adjustment chamber.

6. A method of tensioning a track assembly having an idler wheel, a drive wheel, a drive track entrained about the drive wheel and idler wheel, and a hydraulic motor operable to advance the drive wheel, the method comprising:

coupling a recoil piston of an actuator to the idler wheel, the actuator further including a cylinder housing, recoil chamber, a travel chamber, and a travel piston in fluid communication with the travel chamber;

pressurizing the recoil chamber to tension the track;

supplying pressurized fluid to the hydraulic motor to advance the drive wheel;

delivering fluid to the travel chamber of the actuator responsive to said supply of pressurized fluid to the hydraulic motor; and operating the travel piston to forcibly retract the recoil piston responsive to receipt of said fluid in the travel chamber, whereby retraction of the recoil piston reduces the track tension.

7. A track assembly, comprising:

a drive track;

an idler wheel;

a drive wheel;

a hydraulic motor coupled to the drive wheel and operable to advance the drive track around the drive wheel and the idler wheel;

a drive circuit operable to supply pressurized fluid to drive said hydraulic motor; and a hydraulic actuator coupled to the idler wheel for tensioning the drive track, said actuator including a hydraulic cylinder housing, a recoil piston positioned within said cylinder housing and coupled to the idler wheel, and a travel piston positioned within said cylinder housing, said cylinder housing and said travel piston defining a travel chamber in fluid communication with the drive circuit, wherein said travel chamber is operative to cause said travel piston to contact said recoil piston and urge said recoil piston in a first direction away from the idler wheel responsive to receipt of fluid from the drive circuit.

8. The track assembly of claim 7, wherein said cylinder housing and said recoil piston form a recoil chamber; and wherein said recoil chamber is pressurized to urge the recoil piston in a second direction away from the drive wheel.

9. The track assembly of claim 8, wherein said recoil chamber is fluidly coupled to a hydraulic accumulator.

10. The track assembly of claim 8, wherein said recoil chamber houses a quantity of pressurized gas.

11. The track assembly of claim 8, further including a valve in fluid communication with said drive circuit for recharging the recoil chamber when the pressure therein falls below a predetermined level.

12. The track assembly of claim 7, further including an adjustment piston secured by a linking member to a frame of the track assembly, wherein a position of said actuator cylinder housing relative to the frame is determined by a quantity of fluid acting on said adjustment piston.

13. The track assembly of claim 7, further including a wall bisecting said cylinder housing, said wall forming said recoil chamber in cooperation with said cylinder housing and said recoil piston, said actuator further including an adjustment piston secured by a linking member to a frame of the track assembly, said wall forming an actuator adjustment chamber in cooperation with said hydraulic cylinder and said adjustment piston, wherein a position of said cylinder housing relative to the frame is determined by a quantity of fluid in said actuator adjustment chamber.

14. The track assembly of claim 7, further including a shuttle valve assembly interposed said drive circuit and said travel chamber.

* * * * *